(12) United States Patent
Flatscher et al.

(10) Patent No.: US 9,185,656 B2
(45) Date of Patent: *Nov. 10, 2015

(54) SYSTEM INCLUDING RECEIVER FRONT ENDS

(75) Inventors: Martin Flatscher, Graz (AT); Manfred Greschitz, Graz (AT); Thomas Herndl, Biedermannsdorf (AT); Markus Dielacher, Graz (AT)

(73) Assignee: Infineon Technologies AG, Neubiberg (DE)

( * ) Notice: Subject to any disclaimer, the term of this patent is extended or adjusted under 35 U.S.C. 154(b) by 897 days.

This patent is subject to a terminal disclaimer.

(21) Appl. No.: 13/424,611

(22) Filed: Mar. 20, 2012

(65) Prior Publication Data

US 2012/0178401 A1 Jul. 12, 2012

Related U.S. Application Data

(63) Continuation of application No. 12/401,893, filed on Mar. 11, 2009, now Pat. No. 8,140,047.

(51) Int. Cl.
*H04B 1/16* (2006.01)
*H04W 52/02* (2009.01)

(52) U.S. Cl.
CPC ............ *H04W 52/0245* (2013.01); *Y02B 60/50* (2013.01)

(58) Field of Classification Search
None
See application file for complete search history.

(56) References Cited

U.S. PATENT DOCUMENTS

| 4,725,794 | A | 2/1988 | Barczys | |
|---|---|---|---|---|
| 6,137,355 | A * | 10/2000 | Sevic et al. | 330/51 |
| 6,345,176 | B1 | 2/2002 | Mattisson | |
| 6,442,195 | B1 | 8/2002 | Liu et al. | |
| 7,039,377 | B2 * | 5/2006 | Yates | 455/232.1 |
| 7,142,620 | B2 | 11/2006 | Buda | |
| 7,486,135 | B2 | 2/2009 | Mu | |
| 2006/0084469 | A1 | 4/2006 | Malone et al. | |
| 2010/0130249 | A1 * | 5/2010 | Tam | 455/556.1 |

FOREIGN PATENT DOCUMENTS

WO 2008/145604 12/2008

OTHER PUBLICATIONS

Non-Final Office Action mailed Jul. 1, 2011 in U.S. Appl. No. 12/401,893.

* cited by examiner

*Primary Examiner* — Anh Tran
(74) *Attorney, Agent, or Firm* — Dicke, Billig & Czaja, PLLC

(57) ABSTRACT

An integrated circuit chip includes an output node, receiver front ends, and control logic. The receiver front ends are configured to receive an input signal. Each of the receiver front ends is configured to receive the input signal and provide an output signal at the output node. At least one of the receiver front ends is configured to selectively consume less power. The control logic is configured to select the number of receiver front ends providing an output signal to the output node based on a received signal strength indication.

20 Claims, 5 Drawing Sheets

SYSTEM INCLUDING RECEIVER FRONT ENDS

CROSS-REFERENCE TO RELATED APPLICATIONS

This Utility Patent Application is a continuation application of U.S. application Ser. No. 12/401,893, filed Mar. 11, 2009, which is incorporated herein by reference.

BACKGROUND

Some wireless communication systems include transceivers, where each of the transceivers transmit and receive signals. Typically, to reduce power consumption, a transceiver receives an initial signal and transmits a return signal that indicates whether the strength of the initial signal can be reduced. The transceiver that transmitted the initial signal, receives the return signal and, if the signal strength of the initial signal can be reduced, the transceiver reduces transmission power, which reduces power consumption in the system. This strategy is used in applications, such as cell phone communication systems.

However, some wireless communication systems do not include transceivers. Instead, they include a transmitter on one side and a receiver on the other side. In these systems, the transmitter and receiver do not communicate in bi-directional communication and the strategy outlined above cannot be used to reduce power consumption.

For these and other reasons there is a need for the present invention.

SUMMARY

One embodiment described in the disclosure provides an integrated circuit chip including an output node, receiver front ends, and control logic. The receiver front ends are configured to receive an input signal. Each of the receiver front ends is configured to receive the input signal and provide an output signal at the output node. At least one of the receiver front ends is configured to selectively consume less power. The control logic is configured to select the number of receiver front ends providing an output signal to the output node based on a received signal strength indication.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
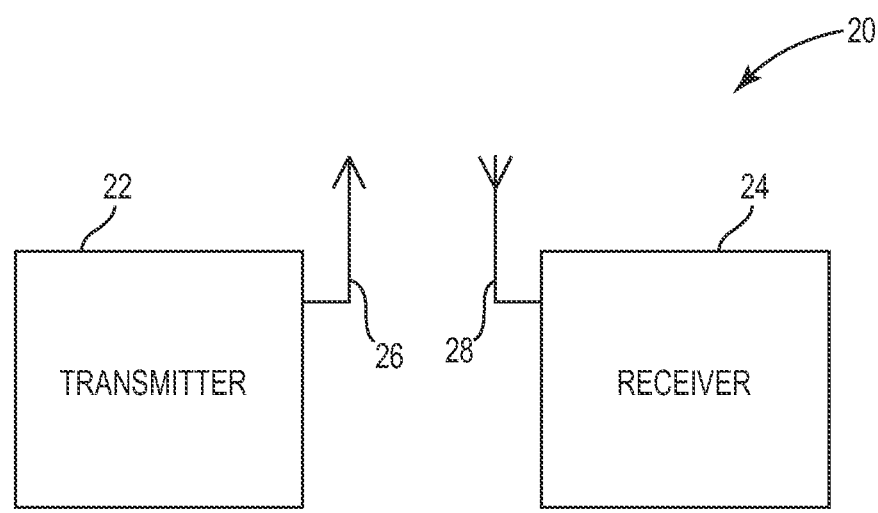
FIG. 1 is a diagram illustrating one embodiment of a wireless communication system.

FIG. 1 is a diagram illustrating one embodiment of a wireless communication system 20 including a transmitter 22 on one side and a receiver 24 on the other side. Transmitter 22 transmits an input signal via transmitter antenna 26 and receiver 24 receives the transmitted input signal via receiver antenna 28. In one embodiment, wireless communication system 20 is part of a wireless remote control application, such as for a television, a DVD player, or a cable television system. In one embodiment, wireless communication system 20 is part of a wireless remote control application, such as for remote keyless entry to an automobile or a building.

Receiver 24 includes multiple receiver front ends that receive the input signal and provide a combined output signal at an output node. Each of the receiver front ends is configured to receive the input signal and provide an output signal to the output node. In one embodiment, the receiver front ends are matching receiver front ends. In one embodiment, the output signal from each of the receiver front ends matches the output signal from each of the other receiver front ends.

At least one of the receiver front ends is configured to selectively consume less power. Based on certain criteria, one or more of the receiver front ends is selected and receiver 24 controls each of the selected receiver front ends to consume less power. This reduces the number of receiver front ends that provide their output signal to the output node. In one embodiment, receiver 24 switches off each of the selected receiver front ends to consume less power. In one embodiment, receiver 24 switches off an amplifier in each of the selected receiver front ends to consume less power. In one embodiment, receiver 24 switches off an amplifier and/or other components in each of the selected receiver front ends to consume less power.

In one embodiment, receiver front ends are selected to consume less power based on a one time programming or setting of the system. In one embodiment, receiver 24 selects and controls receiver front ends to consume less power based on the received signal strength indication (RSSI). In one embodiment, receiver 24 selects and controls receiver front ends to consume less power based on the signal to noise ratio (SNR) of the combined output signal at the output node. In one embodiment, receiver 24 selects and controls receiver front ends to consume less power based on a supply voltage value.

In one embodiment, the number of receiver front ends providing signals to the output node is reduced based on criteria, such as RSSI and/or SNR, being greater than a threshold value. Reducing the number of receiver front ends that provide their output signal to the output node, reduces the SNR of the combined output signal at the output node. The average output signal at the output node stays substantially the same and the average noise figure increases, which results in a smaller SNR. However, the SNR at the output node remains sufficiently high to maintain data integrity.

In one embodiment, receiver 24 monitors the receiver's supply voltage value and increases the number of receiver front ends providing signals to the output node if the supply voltage value drops below a threshold value. Amplifiers clip if their supply voltage is low, e.g., a low battery, and gain is reduced to prevent clipping. However, reducing the gain decreases the SNR. To increase the SNR, the noise figure is reduced by switching on more receiver front ends.

In one embodiment, the output signal from each of the receiver front ends is substantially equal to the average output signal at the output node of receiver front ends providing their output signal to the output node. In one embodiment, the noise figure from each of the receiver front ends is greater than the average noise figure at the output node of receiver front ends providing their output signal to the output node. In other embodiments, transmitter 22 can be a transceiver and receiver 24 can be a transceiver, where the receiving transceiver regulates its own receiving power consumption.

Receiver 24 regulates its own receiving power consumption, where power consumption can be reduced without reducing transmission power. Also, transmitter 22 and receiver 24 are not in bi-directional communication.

Figure 2:
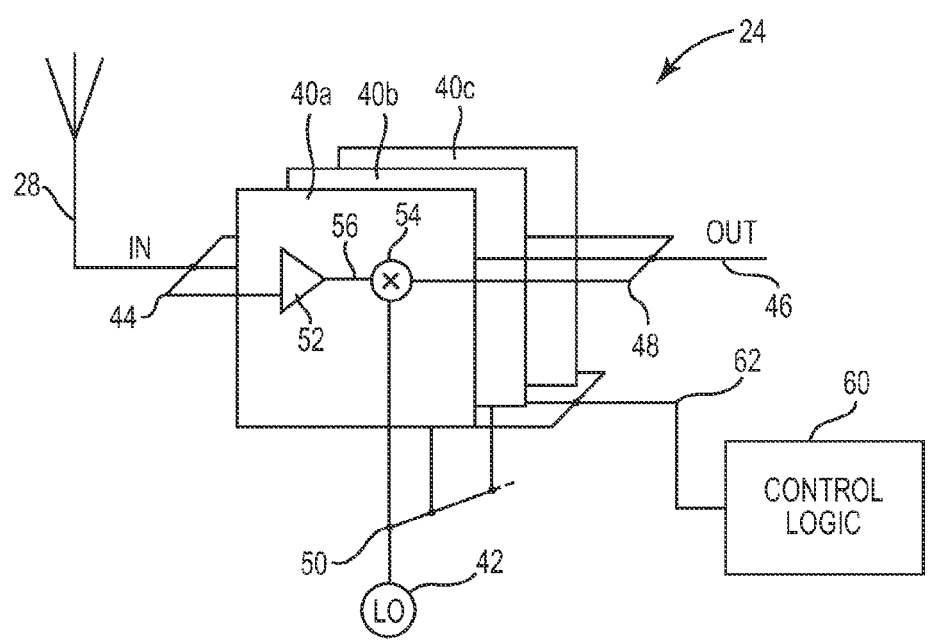
FIG. 2 is a diagram illustrating one embodiment of a receiver.

FIG. 2 is a diagram illustrating one embodiment of receiver 24 that receives input signal IN via receiver antenna 28. Input signal IN is transmitted to receiver 24 via a transmitter, such as transmitter 22. Receiver 24 includes receiver front ends 40a-40c and a local oscillator 42. In other embodiments, receiver 24 includes another suitable number of receiver front ends, such as at least two receiver front ends or more than three receiver front ends.

Each of the receiver front ends 40a-40c is electrically coupled to each of the other receiver front ends 40a-40c and to receiver antenna 28 via input path 44. Also, each of the receiver front ends 40a-40c is electrically coupled to each of the other receiver front ends 40a-40c and to output node 46 via output path 48. In addition, each of the receiver front ends 40a-40c is electrically coupled to each of the other receiver front ends 40a-40c and to local oscillator 42 via oscillator path 50.

Receiver front ends 40a-40c are configured to provide a combined output signal OUT at output node 46. Each of the receiver front ends 40a-40c receives input signal IN at 44 and provides an output signal at 48 to output node 46. In one embodiment, receiver front ends 40a-40c are matching receiver front ends. In one embodiment, the output signal from each of the receiver front ends 40a-40c matches the output signal from each of the other receiver front ends 40a-40c.

Receiver front end 40a includes an amplifier 52 and a mixer 54. The input of amplifier 52 is electrically coupled to receiver antenna 28 via input path 44 and the output of amplifier 52 is electrically coupled to an input of mixer 54 via amplifier output path 56. Local oscillator 42 is electrically coupled to another input of mixer 54 via oscillator path 50 and the output of mixer 54 is electrically coupled to output node 46 via output path 48. In one embodiment, amplifier 52 is a low noise amplifier.

Each of the other receiver front ends 40b and 40c includes an amplifier similar to amplifier 52 and a mixer similar to mixer 54. The amplifier and mixer in each of the other receiver front ends 40b and 40c are electrically coupled similar to amplifier 52 and mixer 54. In one embodiment, each of the amplifiers in each of the receiver front ends 40a-40c is a low noise amplifier. Amplifier 52 and each of the amplifiers in the other receiver front ends 40b and 40c receive input signal IN at 44 via receiver antenna 28.

Local oscillator 42 provides an oscillating signal at 50. Mixer 54 and each of the mixers in the other receiver front ends 40b and 40c receive the oscillating signal at 50 from local oscillator 42.

Amplifier 52 receives input signal IN at 44 via receiver antenna 28 and is configured to provide an amplified output signal at 56. Mixer 54 receives the amplified output signal at 56 and the oscillating signal at 50 and is configured to provide an intermediate frequency (IF) output signal at 48. Each of the amplifiers in each of the other receiver front ends 40b and 40c is configured to receive input signal IN at 44 via receiver antenna 28 and provide an amplified output signal, similar to amplifier 52. Also, each of the mixers in each of the other receiver front ends 40b and 40c is configured to receive the respective amplified output signal and the oscillating signal at 50 and provide an IF output signal at 48. These IF output signals at 48 are combined to provide output signal OUT at output node 46. In one embodiment, the IF output signal at 48 from each of the mixers, including mixer 54, matches the IF output signal at 48 from each of the other mixers. In one embodiment, the IF is zero, such that each of the amplified output signals from the amplifiers is mixed directly into baseband.

Receiver 24 includes control logic 60 that controls receiver front ends 40a-40c. Each of the receiver front ends 40a-40c is electrically coupled to control logic 60 via control path 62. Also, each of the receiver front ends 40a-40c is configured to selectively consume less power. Based on certain criteria, control logic 60 selects and controls each of the selected receiver front ends 40a-40c to consume less power. This reduces or increases the number of receiver front ends 40a-40c providing an IF output signal to output node 46. In one embodiment, control logic 60 switches off the amplifier, such as amplifier 52, in each of the selected receiver front ends 40a-40c to consume less power. In one embodiment, control logic 60 switches off the amplifier and/or the mixer, such as mixer 54, in each of the selected receiver front ends 40a-40c to consume less power.

In one embodiment, control logic 60 controls the selected receiver front ends 40a-40c to consume less power based on a one time programming process. In one embodiment, control logic 60 controls the selected receiver front ends 40a-40c to consume less power based on the RSSI being greater than a threshold value. In one embodiment, control logic 60 controls the selected receiver front ends 40a-40c to consume less power based on the SNR of the combined output signal OUT at output node 46 being greater than a threshold value. In one embodiment, control logic 60 controls the selected receiver front ends 40a-40c to consume less power based on the RSSI and the SNR being greater than threshold values. In one embodiment, control logic 60 controls the selected receiver front ends 40a-40c to consume more power based on a supply voltage value being less than a threshold value.

Reducing the number of receiver front ends 40a-40c providing their IF output signal at 48 to output node 46, reduces the SNR of the combined output signal OUT at 46. The average output signal at output node 46 stays substantially the same, but the average noise figure or factor increases, which results in a smaller SNR. However, the SNR at the output node remains sufficiently high to maintain data integrity.

In one embodiment, control logic 60 monitors the amplifier's supply voltage value and increases the number of receiver front ends 40a-40c providing their IF output signal at 48 to output node 46 if the supply voltage value drops below a threshold value. Amplifiers clip if their supply voltage is low and gain is reduced to prevent clipping. However, reducing the gain decreases the SNR. To increase the SNR, the noise figure is reduced by switching on more receiver front ends 40a-40c.

In one embodiment, the IF output signal at 48 from each of the receiver front ends 40a-40c is substantially equal to the average output signal at output node 46, of receiver front ends 40a-40c providing an IF output signal to output node 46. In one embodiment, the noise figure from each of the receiver front ends 40a-40c is greater than the average noise figure at output node 46, of receiver front ends 40a-40c providing an IF output signal to output node 46.

Figure 3A:
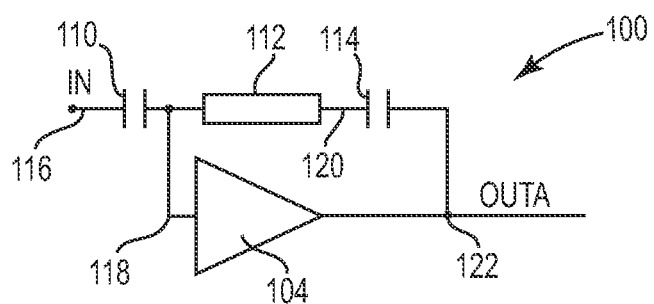
FIG. 3a is a diagram illustrating one embodiment of a receiver circuit including an amplifier.
Figure 3B:
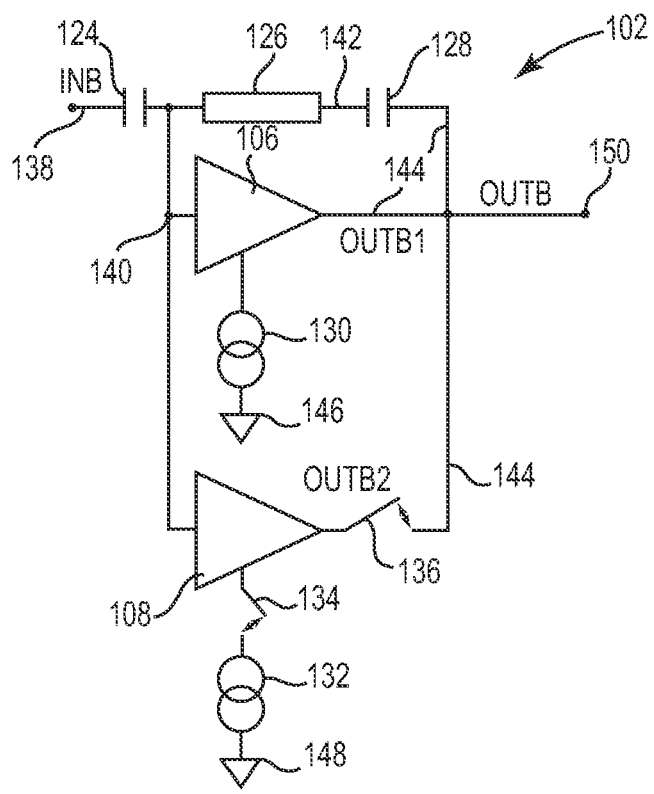
FIG. 3b is a diagram illustrating one embodiment of a double receiver front end including two amplifiers.

FIGS. 3A and 3B are diagrams illustrating a receiver circuit 100 that is scaled to a double receiver front end 102. Receiver circuit 100 includes one amplifier 104 and double receiver front end 102 includes two amplifiers 106 and 108. Receiver circuit 100 can be replaced with double receiver front end 102 having two receiver front ends, such as receiver front ends 40a and 40b, where each of the amplifiers 104 and 106 is situated in a different one of the two receiver front ends that are controlled to reduce power consumption.

Each of the two amplifiers 106 and 108 are scaled down versions of amplifier 104, where amplifier 104 is scaled down by reducing transistor and resistor widths by a factor of 2. Also, each of the scaled down amplifiers 106 and 108 consumes about half the power that amplifier 104 consumes and each of the scaled down amplifiers 106 and 108 needs substantially half the layout area on the integrated circuit chip as amplifier 104.

FIG. 3A is a diagram illustrating one embodiment of receiver circuit 100 including amplifier 104. Receiver circuit 100 includes amplifier 104, input capacitor 110 and a feedback network including resistor 112 and feedback capacitor 114. One side of input capacitor 110 receives input signal IN at 116 and the other side of input capacitor 110 is electrically coupled to one side of resistor 112 and an input of amplifier 104 via input path 118. The other side of resistor 112 is electrically coupled to one side of feedback capacitor 114 via path 120 and the other side of feedback capacitor 114 is electrically coupled to the output of amplifier 104 via output path 122. Amplifier 104 provides amplified output signal OUTA at 122.

Amplifier 104 is a low noise amplifier that has a noise figure of substantially 3 dB, a gain of substantially 20 dB and current consumption of substantially 940 micro-amps (uA). The input impedance at 116, which is determined by the feedback network, including resistor 112 and feedback capacitor 114, is substantially 600 ohms.

FIG. 3B is a diagram illustrating one embodiment of double receiver front end 102 including amplifiers 106 and 108. Double receiver front end 102 includes amplifiers 106 and 108, input capacitor 124, a feedback network including resistor 126 and feedback capacitor 128, a first current source 130, a second current source 132, a first switch 134 and a second switch 136. One side of input capacitor 124 receives input signal INB at 138 and the other side of input capacitor 124 is electrically coupled to one side of resistor 126, an input of amplifier 106 and an input of amplifier 108 via input path 140. The other side of resistor 126 is electrically coupled to one side of feedback capacitor 128 via path 142 and the other side of feedback capacitor 128 is electrically coupled to the output of amplifier 106 and the output of amplifier 108 via output path 144. Amplifier 106 is electrically coupled to first current source 130 and the other side of first current source 130 is electrically coupled to a reference, such as ground, at 146. Amplifier 108 is electrically coupled to one side of first switch 134 and the other side of first switch 134 is electrically coupled to one side of second current source 132. The other side of second current source 132 is electrically coupled to a reference, such as ground, at 148. The output of amplifier 108 is electrically coupled to one side of second switch 136 and the other side of second switch 136 is electrically coupled to output node 150 via output path 144. Amplifier 106 provides an amplified output signal OUTB1 at 144 and amplifier 108 provides an amplified output signal OUTB2 at 136. The output signal OUTB at output node 150 is one of the output signal OUTB1 at 144 of amplifier 106 or the combined output signals OUTB1 and OUTB2 of amplifiers 106 and 108.

Each of the amplifiers 106 and 108 is a low noise amplifier that has a gain of substantially 20 dB and current consumption of substantially 520 uA. The gain of each of the amplifiers 106 and 108 is substantially the same as the gain of amplifier 104 due to the reduced trans-conductance gm of the transistors being compensated by the higher resistance of the load resistors. The input impedance at 138, which is determined by the feedback network, including resistor 126 and feedback capacitor 128, is substantially 600 ohms.

Amplifier 108 is configured to selectively consume less power. Based on certain criteria, double receiver front end 102 selectively controls amplifier 108 to consume less power. If both amplifiers 106 and 108 are used, first switch 134 and second switch 136 are closed and amplifiers 106 and 108 provide output signals OUTB1 and OUTB2 in combined output signal OUTB at output node 150. If only amplifier 106 is used, double receiver front end 102 selects amplifier 108 and opens first switch 134 to switch off amplifier 108, which reduces power consumption. Opening first switch 134, switches off amplifier 108 and reduces the number of amplifiers providing output signals to output node 150. Amplifier 106 provides output signal OUTB1 in output signal OUTB at output node 150.

Output switch 136 can remain closed in each situation, where double receiver front end 102 uses both amplifiers 106 and 108 and where double receiver front end 102 uses only amplifier 106. In one embodiment, double receiver front end 102 also opens second switch 136 if only using amplifier 106. In one embodiment, double receiver front end 102 does not include output switch 136 and the output of amplifier 108 is electrically connected to output node 150.

In one embodiment, double receiver front end 102 selectively controls amplifier 108 to consume less power based on a one time programming process. In one embodiment, double receiver front end 102 selectively controls amplifier 108 to consume less power based on the RSSI being greater than a threshold value. In one embodiment, double receiver front end 102 selectively controls amplifier 108 to consume less power based on the SNR of output signal OUTB at output node 150 being greater than a threshold value. In one embodiment, double receiver front end 102 selectively controls amplifier 108 to consume less power based on the RSSI and the SNR being greater than threshold values. In one embodiment, double receiver front end 102 selectively controls amplifier 108 to consume more power based on the amplifier's supply voltage value being less than a threshold value.

Amplifier 106 provides output signal OUTB1 and amplifier 108 provides output signal OUTB2 that is substantially equal to output signal OUTB1. If only amplifier 106 provides output signal OUTB1 to output node 150, the average output signal at 150 is OUTB1 at 150. Also, if both amplifiers 106 and 108 provide output signals OUTB1 and OUTB2 to output node 150, the average output signal at 150 is equal to OUTB1 or OUTB2. Thus, the average output signal at output node 150 remains equal to OUTB1.

The noise figure generated via amplifier 106 is independent of the noise figure generated via amplifier 108. These noise figures are substantially the same and equal to a noise figure N. If only amplifier 106 provides output signal OUTB1 to output node 150, the average noise figure is N. If both amplifiers 106 and 108 provide output signals OUTB1 and OUTB2 to output node 150, the average noise figure is the noise figure N divided by the square root of 2, such that the power of the noise figure is decreased by a factor of 2 and the SNR is doubled. Thus, reducing the number of amplifiers reduces the SNR of output signal OUTB at 150. However, the SNR at the output node remains sufficiently high to maintain data integrity.

Double receiver front end 102 includes a number of features. Amplifiers 106 and 108 each have a gain that is substantially the same as the gain of amplifier 104. The input impedance of double receiver front end 102 is determined by the feedback network, including resistor 126 and feedback capacitor 128, and is substantially the same as the input impedance of receiver circuit 100. For built in self test, double receiver front end 102 can include a signal generator that provides a signal to the inputs of amplifiers 106 and 108 and the characteristics, such as gain and phase shift, of output signals OUTB1 and OUTB2 can be compared. Also, double receiver front end 102 uses a chip area that is substantially the same as the chip area used for receiver circuit 100. In other embodiments, where multiple receiver front ends are used, failures of some receiver front ends can be tolerated via use of the remaining receiver front ends.

Figure 4:
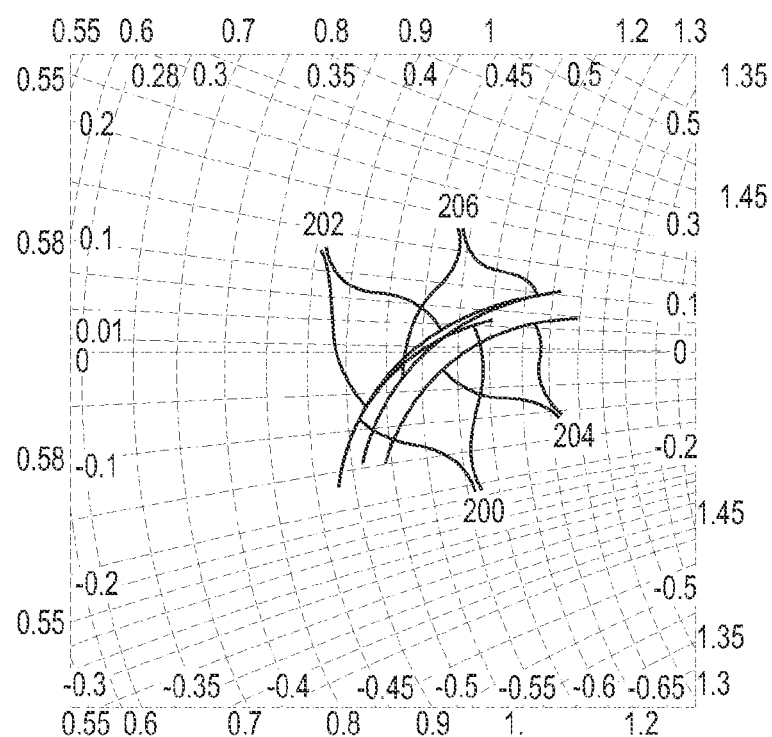
FIG. 4 is a graph illustrating the input impedances of a receiver and a double receiver front end.

FIG. 4 is a graph illustrating the input impedances of receiver 100 and double receiver front end 102. The graph is a 600 Ohm Smith chart of input impedances from 500 megahertz (MHz) to 1 gigahertz (GHz). The input impedance of receiver 100 at 200 and the input impedance of double receiver front end 102 with both amplifiers 106 and 108 providing output signals OUTB1 and OUTB2 to output node 150 at 202 are partially on top of one another and close to the same value over frequency from 500 MHz to 1 GHz.

The other two input impedances at 204 and 206 are of double receiver front end 102 with only amplifier 106 providing output signal OUTB1 to output node 150. The input impedance at 204 is double receiver front end 102 with first switch 134 open and second switch 136 closed. The input impedance at 206 is double receiver front end 102 with first switch 134 open and second switch 136 open. All four input impedances at 200, 202, 204 and 206 are nearly the same over frequency from 500 MHz to 1 GHz.

Figure 5:
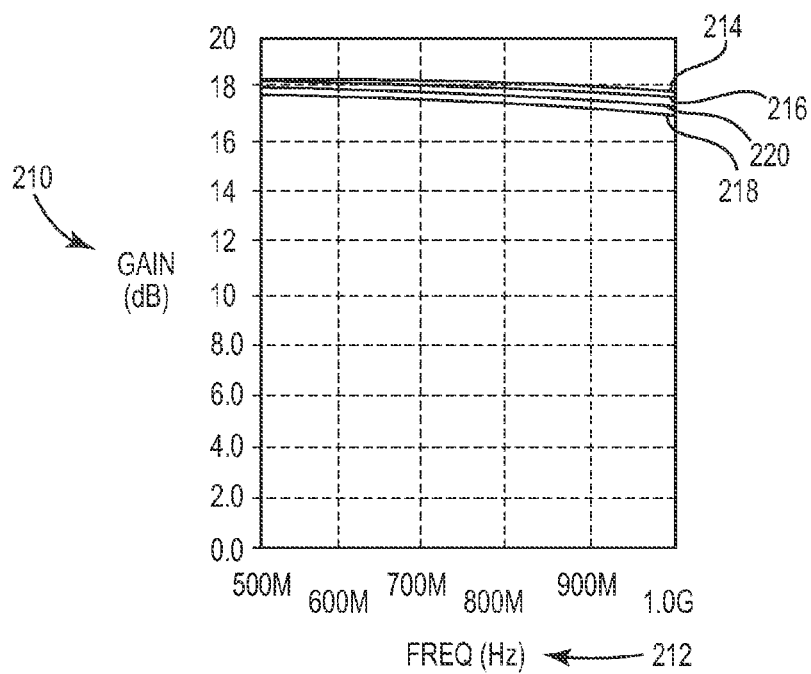
FIG. 5 is a graph illustrating the gain of a receiver and a double receiver front end versus frequency.

FIG. 5 is a graph illustrating gain at 210 versus frequency at 212 from 500 MHz to 1 GHz. The gain of receiver 100 at 214 and the gain of double receiver front end 102 with both amplifiers 106 and 108 providing output signals OUTB1 and OUTB2 to output node 150 at 216 are partially on top of one another and close to the same value over frequency from 500 MHz to 1 GHz.

The other two gains at 218 and 220 are of double receiver front end 102 with only amplifier 106 providing output signal OUTB1 to output node 150. The gain at 218 is double receiver front end 102 with first switch 134 open and second switch 136 closed. The gain at 220 is double receiver front end 102 with first switch 134 open and second switch 136 open. All four gains at 214, 216, 218 and 220 are nearly the same over frequency from 500 MHz to 1 GHz.

Figure 6:
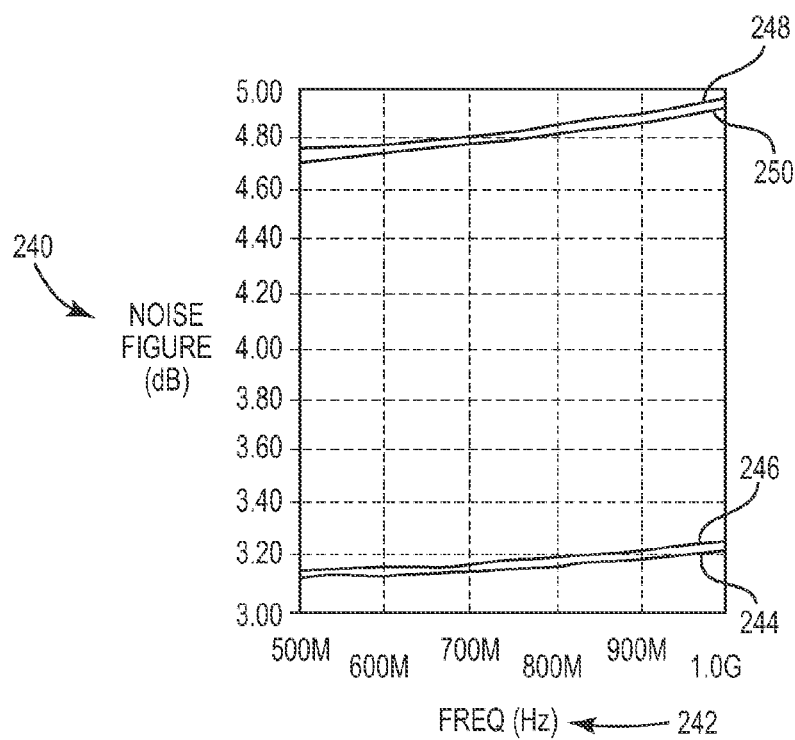
FIG. 6 is a graph illustrating the noise figure of a receiver and a double receiver front end versus frequency.

FIG. 6 is a graph illustrating the noise figure at 240 versus frequency at 242 from 500 MHz to 1 GHz. The noise figure of receiver 100 at 244 and the noise figure of double receiver front end 102 with both amplifiers 106 and 108 providing output signals OUTB1 and OUTB2 to output node 150 at 246 are close to the same value of 3.2 dB over frequency from 500 MHz to 1 GHz.

The other two noise figures at 248 and 250 are of double receiver front end 102 with only amplifier 106 providing output signal OUTB1 to output node 150. The noise figure at 248 is from double receiver front end 102 with first switch 134 open and second switch 136 closed. The noise figure at 250 is from double receiver front end 102 with first switch 134 open and second switch 136 open. The noise figures at 248 and 250 of 4.7 to 5 dB are greater than the noise figures at 244 and 246 of 3.1 to 3.3 dB.

Thus, the noise figure increases when only one amplifier is used as opposed to more than one amplifier. This decreases the SNR when only one amplifier is used as opposed to more than one amplifier.

In operation, the number of amplifiers providing signals to the output node is reduced if a criteria, such as RSSI and/or SNR, is greater than a threshold value, and increased if a criteria, such as supply voltage value, is less than a threshold value. The SNR is reduced by reducing the number of amplifiers and increased by increasing the number of amplifiers.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated circuit chip comprising:
an output node;
receiver front ends configured to receive an input signal, wherein each of the receiver front ends is configured to receive the input signal and provide an output signal at the output node and at least one of the receiver front ends is configured to selectively consume less power; and
control logic configured to select the number of receiver front ends providing an output signal to the output node based on a received signal strength indication.

2. The integrated circuit chip of claim 1, wherein the control logic is further configured to select the number of receiver front ends providing an output signal to the output node based on a one time programming of the integrated circuit chip.

3. The integrated circuit chip of claim 1, wherein the input signal comprises a wireless input signal.

4. The integrated circuit chip of claim 1, wherein the control logic is further configured to select the number of receiver front ends providing an output signal to the output node based on a signal to noise ratio.

5. The integrated circuit chip of claim 1, wherein the control logic is further configured to select the number of receiver front ends providing an output signal to the output node based on a supply voltage value.

6. The integrated circuit chip of claim 1, wherein the output signal from one of the receiver front ends matches the output signal from each of the other receiver front ends.

7. The integrated circuit chip of claim 1, wherein each of the receiver front ends comprises at least one of:
an amplifier that receives the input signal; and
a mixer that provides the output signal.

8. The integrated circuit chip of claim 7, wherein the amplifier is a low noise amplifier.

9. The integrated circuit chip of claim 1, wherein the output signal from each of the receiver front ends is substantially equal to an average output signal at the output node.

10. The integrated circuit of claim 1, wherein the noise figure from each of the receiver front ends is greater than average noise figure at the output node.

11. An integrated circuit chip comprising:
a first amplifier configured to receive an input signal and provide a first output signal at an output node;
a second amplifier configured to receive the input signal and provide a second output signal at the output node, wherein the first output signal matches the second output signal and at least one of the first amplifier and the second amplifier is configured to selectively consume less power;
control logic configured to selectively activate and deactivate at least one of the first amplifier and the second amplifier based on a received signal strength indication; and
a circuit configured to maintain the input impedance of the integrated circuit chip at a substantially constant value independent of the number of active amplifiers.

12. The integrated circuit chip of claim 11, wherein the control logic is further configured to selectively activate and deactivate at least one of the first amplifier and the second amplifier based on at least one of a signal to noise ratio and a supply voltage value.

13. The integrated circuit chip of claim 11, wherein the control logic is further configured to selectively activate and deactivate at least one of the first amplifier and the second amplifier based on a one time programming of the integrated circuit chip.

14. The integrated circuit chip of claim 11, wherein the input signal comprises a wireless input signal.

15. The integrated circuit chip of claim 11, wherein the first output signal is substantially equal to an average of the first output signal and the second output signal and the noise figure from each of the first amplifier and the second amplifier is greater than an average noise figure at the output node.

16. A method of reducing power in a system, comprising:
providing an output node;
providing receiver front ends that receive an input signal and are each configured to provide an output signal to the output node;
receiving the input signal at each of the receiver front ends;
selecting receiver front ends; and
consuming less power in the selected receiver front ends based on a received signal strength indication.

17. The method of claim 16, wherein selecting receiver front ends comprises:
selecting the receiver front ends based on a one time setting.

18. The method of claim 16, wherein consuming less power comprises:
switching off an amplifier in each of the selected receiver front ends.

19. The method of claim 16, wherein the output signal from each of the receiver front ends matches the output signal from each of the other receiver front ends.

20. The method of claim 16, wherein receiving the input signal at each of the receiver front ends comprises receiving the input signal at an amplifier and comprising providing the output signal from a mixer.

* * * * *